United States Patent [19]
Castle

[11] Patent Number: 6,032,924
[45] Date of Patent: Mar. 7, 2000

[54] MOTORIZED VALVE ACTUATING DEVICE

[75] Inventor: Robert W. Castle, Pawtucket, R.I.

[73] Assignee: SPARCO Inc., Warwick, R.I.

[21] Appl. No.: 09/235,979

[22] Filed: Jan. 22, 1999

[51] Int. Cl.[7] .................................................. F16K 31/04
[52] U.S. Cl. ............................... 251/129.12; 251/129.11; 251/129.02; 251/250
[58] Field of Search ......................... 251/129.11, 129.12, 251/250, 129.02

[56] References Cited

U.S. PATENT DOCUMENTS

| | | |
|---|---|---|
| 2,052,987 | 9/1936 | Persons . |
| 2,912,215 | 11/1959 | Forrester . |
| 4,318,530 | 3/1982 | Lissmyr et al. . |
| 4,551,072 | 11/1985 | Barall . |
| 4,807,700 | 2/1989 | Wilkins . |
| 4,836,497 | 6/1989 | Beeson . |
| 4,895,301 | 1/1990 | Kennedy ........................ 251/129.02 X |
| 5,145,146 | 9/1992 | Matsushima ....................... 251/129.02 |
| 5,529,282 | 6/1996 | Lebkuchner . |
| 5,941,500 | 8/1999 | Lebkuchner ........................ 251/250 X |

Primary Examiner—Kevin Lee
Attorney, Agent, or Firm—Salter & Michaelson

[57] ABSTRACT

A valve actuating device for opening and closing a valve is disclosed. The valve has a valve housing, a valve member sealingly engageable with a valve seat formed in the valve housing and a valve stem attached to the valve member for moving the valve member from an open position to a closed position, the valve member being biased to the open position. The valve actuating device includes a housing which is constructed to be attachable to the valve housing of the valve, a bidirectional motor mounted on the housing and a pinion gear which is coupled to the motor by a shaft, the pinion gear being drivable by the motor via the shaft. The device further includes a rack including a body having an end portion which is engageable with the valve stem of the valve and a side portion having a number of teeth thereon for meshing with teeth of the pinion gear, the rack being moveable, by the motor driving the pinion gear, between a first position in which the valve is in its open position and a second position in which the end portion of the rack engages the valve stem for maintaining the valve stem in its closed position.

5 Claims, 5 Drawing Sheets

MOTORIZED VALVE ACTUATING DEVICE

BACKGROUND OF THE INVENTION

1. Field of the Invention

This invention relates generally to valves used in a heating system. More particularly, the present invention relates to a valve actuating device for a zone heating and/or cooling system which is both opened and closed by a D.C. motor.

2. Discussion of the Related Art

In zone heating and/or cooling systems, valves are provided for controlling the flow of heated or cooled fluid (e.g., water or coolant) to the zones they service. One type of valve well-known in the heating and cooling industry is a heat motor type valve which utilizes wax as a pressure medium for opening and closing a valve member. More particularly, wax, in its hardened state, is softened by suitable heating means for moving the valve member of the valve from its closed to its opened position. This type of valve is desirous in circumstances where the valve needs to be opened slowly to prevent water hammer in the system. Water hammer is caused by opening or closing a valve too quickly in a system thereby causing a pressure wave which moves back and forth within the system until the pressure wave comes into contact with another valve or an end of a particular branch of the system. However, the heat motor valve suffers from the limitation that it takes too long to heat the wax and therefore too long to open and close the valve member. Typically, such a valve takes approximately four minutes to open and six minutes to close. Contractors installing a heating and/or cooling system find the waiting period between the opening and closing of the valve too long to adequately test the valve after it has been installed in the system. Although the performance of such valves is not suspect, the waiting period causes many contractors to avoid using this type of valve.

As an alternative to the heat motor type valve, another valve available to contractors is actuated by a solenoid switch which immediately introduces or cuts-off fluid to the system. However, this valve has been known to cause water hammer since it opens and closes the valve too quickly. There is presently a need for a valve which does not open and close immediately as the solenoid switch actuated valve and takes less time to open and close than the heat motor type valve.

Reference can be made to U.S. Pat. No. 5,529,282 to Lebkuchner, which is assigned to the assignee of the present application, as a solution to the foregoing problems associated with the prior art. More specifically, this patent discloses a valve actuating device comprising a housing having a fitting which is threadably received by a fitting receiving formation of a valve for securing the housing to the valve. The device further includes an electric motor mounted on the housing, the motor being adapted to drive a shaft having a pinion gear upon its activation for opening the valve. A rack has teeth engageable with the pinion gear of the electric motor and an end portion engageable with a valve stem of the valve. The arrangement is such that the rack is movable upon activation of the motor from a first position in which the end portion of the rack engages the valve stem for maintaining the valve stem in its closed position against the bias of valve stem biasing means (e.g., a spring), to a second position in which, upon activation of the motor, the rack is moved via the pinion gear of the motor away from the valve stem thereby enabling the valve stem biasing means to move the valve member to its open position. Two springs bias the rack to its first position.

While certainly effective for its intended purpose, since the actuator device disclosed in the Lebkuchner patent must continuously energize the motor in order to maintain the valve in the open position. This puts undue stress on the motor and therefore shortens the life of the motor. Furthermore, due to the design of the Lebkuchner device, the valve can only be fully open or fully closed. The device does not allow the valve to be held partially open in order to modulate the flow of fluid through the valve.

SUMMARY OF THE INVENTION

The present invention is directed to a valve actuating device which includes a D.C. motor for both opening and closing a valve. The D.C. motor eliminates the need to keep the motor energized to maintain the valve in the open position since, once the rack is moved upward to enable the valve to open, the motor can be de-energized while still holding the rack in place. Furthermore, the D.C. motor can be programmed to partially open the valve in order to modulate the amount of fluid which flows through the valve.

According to a preferred embodiment of the invention, a valve actuating device for opening and closing a valve is disclosed. The valve has a valve housing, a valve member sealingly engageable with a valve seat formed in the valve housing and a valve stem attached to the valve member for moving the valve member from an open position to a closed position, the valve member being biased to the open position. The valve actuating device includes a housing which is constructed to be attachable to the valve housing of the valve, a bidirectional motor mounted on the housing and a pinion gear which is coupled to the motor by a shaft, the pinion gear being drivable by the motor via the shaft. The device further includes a rack including a body having an end portion which is engageable with the valve stem of the valve and a side portion having a number of teeth thereon for meshing with teeth of the pinion gear, the rack being moveable, by the motor driving the pinion gear, between a first position in which the valve is in its open position and a second position in which the end portion of the rack engages the valve stem for maintaining the valve stem in its closed position.

The bidirectional motor includes circuitry for controlling power supplied to the motor for a first amount of time in which the rack is moved from the first position to the second position, and for controlling power supplied to the motor for a second amount of time in which the rack is moved from the second position to the first position.

BRIEF DESCRIPTION OF THE DRAWINGS

In the drawings which illustrate the best mode presently contemplated for carrying out the present invention.

DETAILED DESCRIPTION

Figure 1:
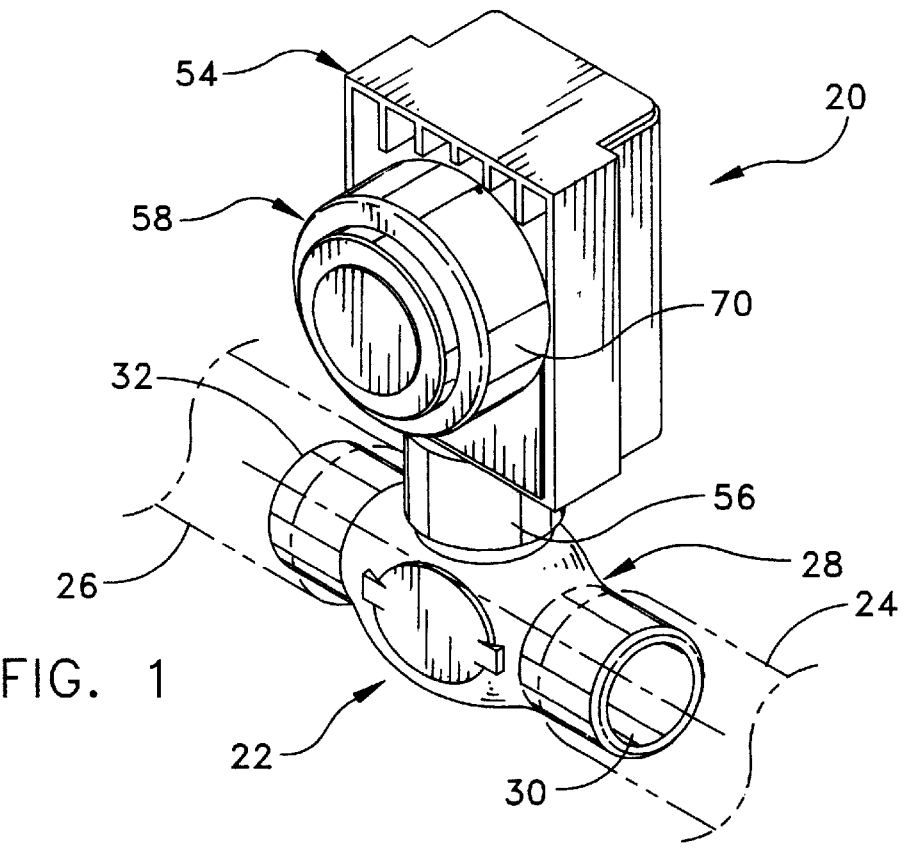
FIG. 1 is a front perspective view of a valve actuating device of the present invention, the device being threadably secured to a plunger-type valve.
Figure 2:
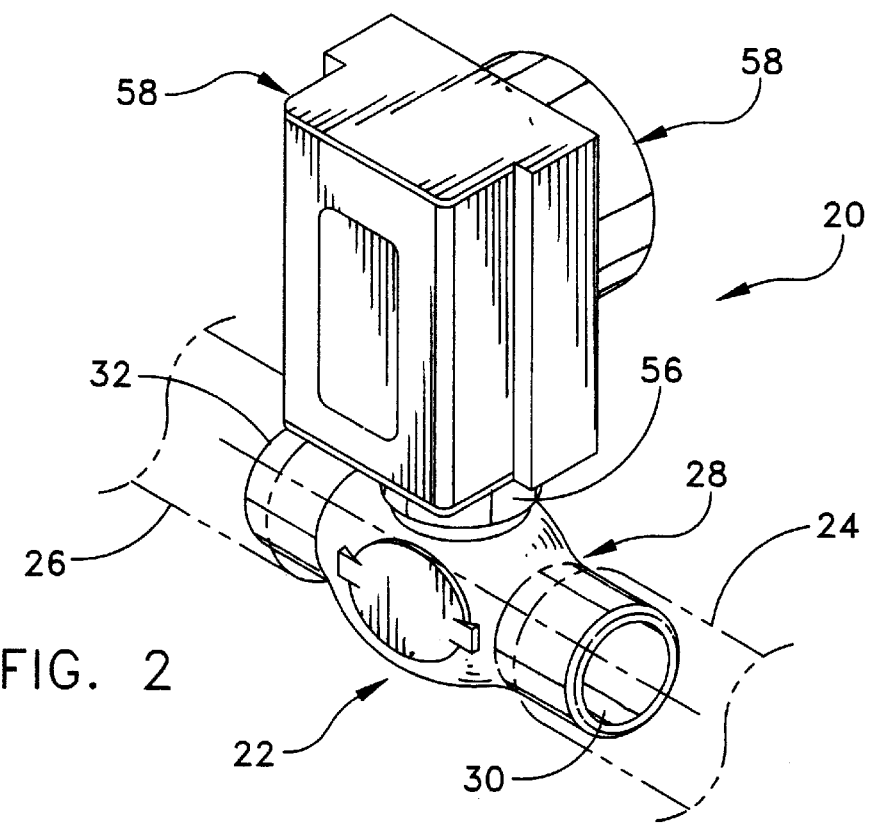
FIG. 2 is a rear perspective view thereof.

This invention progresses the basic concept taught in the above-identified U.S. Pat. No. 5,529,282, which is incorporated herein by reference. Briefly, and by way of review, there is generally indicated at 20 a valve actuating device for opening and closing a valve, generally indicated at 22. The valve 22 is part of a zone heating and/or cooling system having an inlet pipe 24 and an outlet pipe 26, both illustrated in broken lines in FIGS. 1 and 2, for connecting the valve 22 to the system. The valve actuating device 20 of the present invention is especially suited for delivering fluid (e.g., water or coolant) to a zone of the system when called upon at a rate which does not cause water hammer and which is not excessively slow.

Figure 3:
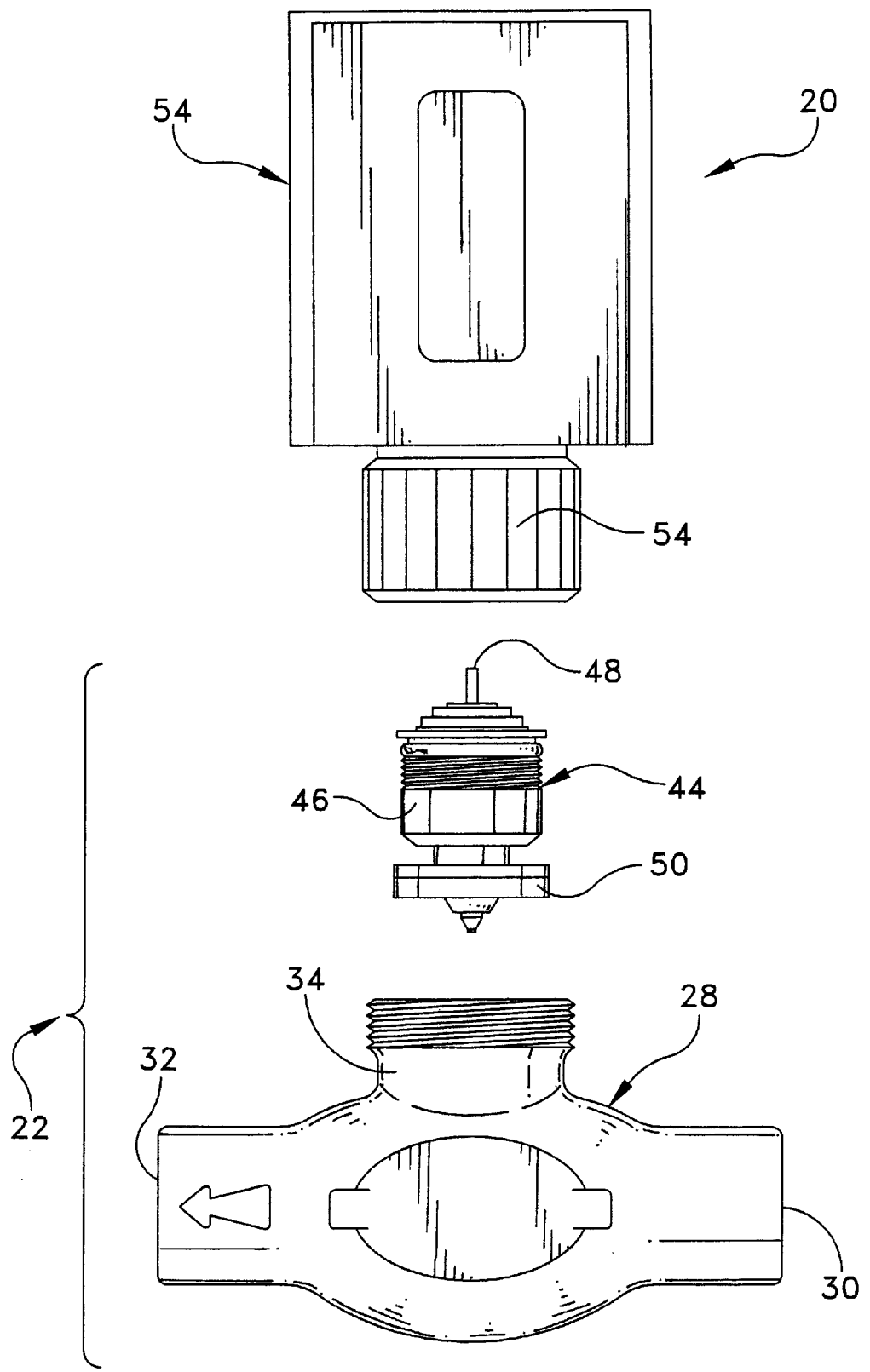
FIG. 3 is an exploded rear elevational view of a valve member and stem arrangement of the valve and the manner upon which the valve is secured to the valve actuating device.
Figure 4:
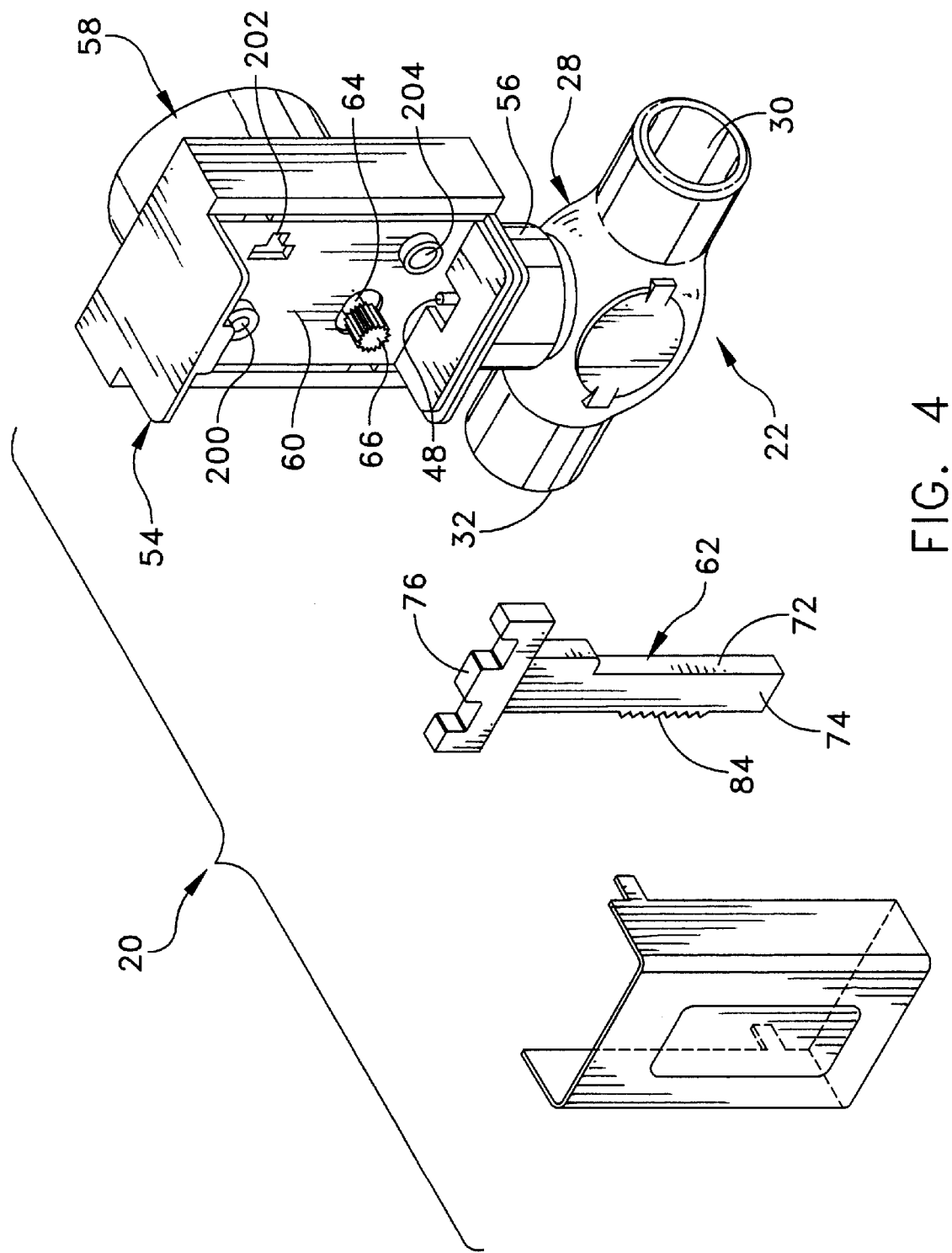
FIG. 4 is an exploded rear perspective view of the component parts of the valve actuating device of a first embodiment.
Figure 5:
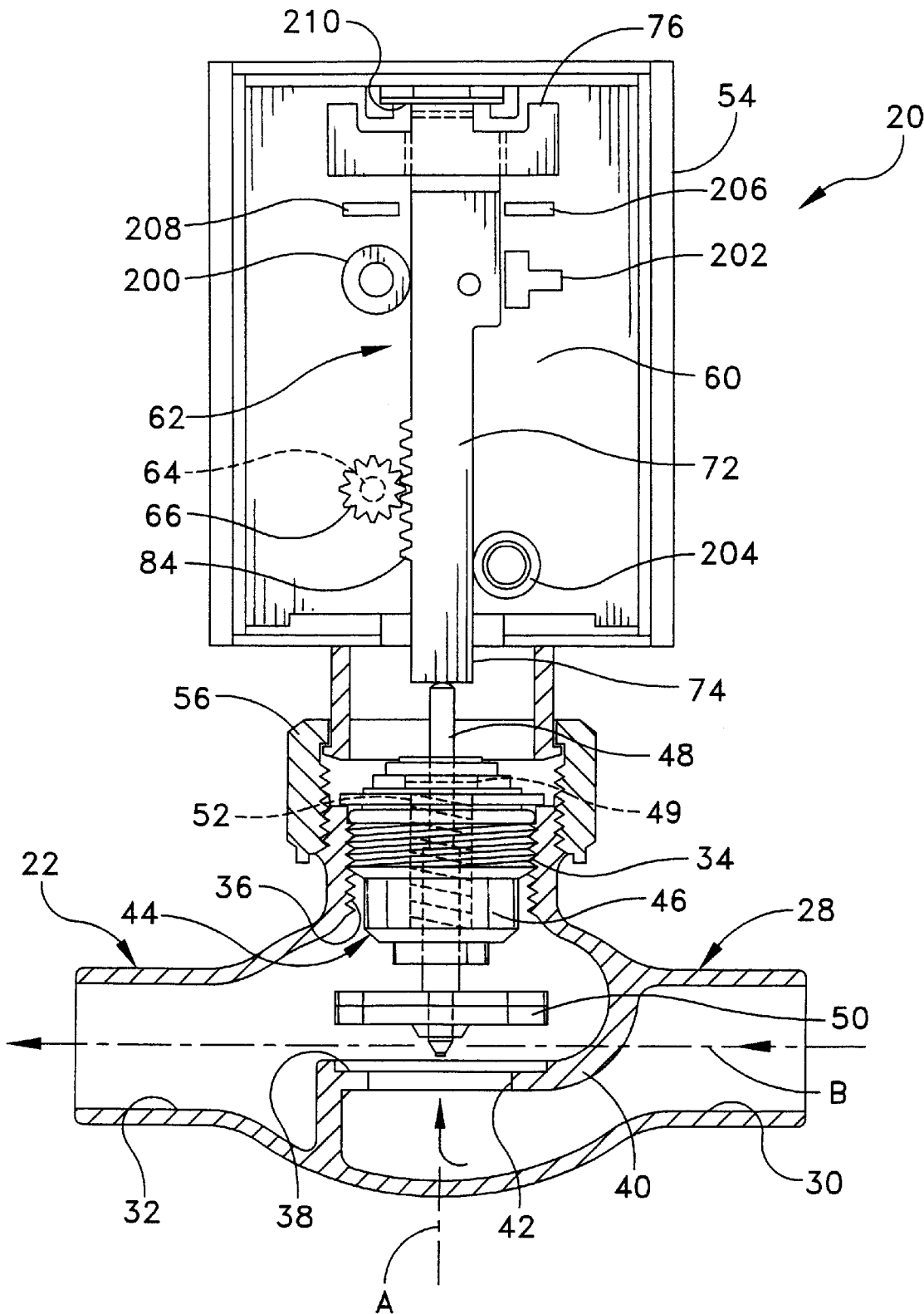
FIGS. 5 and 6 are cross-sectional views in elevation of the first embodiment of the valve actuating device and the valve with the valve actuating device being illustrated in varying positions of operation.

Turning now to FIGS. 3–5, the valve 22 is a standard globe valve which is commonly found in such systems. As illustrated in these drawings, the valve 22 comprises a valve housing, generally indicated at 28, which is preferably fabricated from cast bronze. The valve housing 28 has an inlet 30 which is suitably connected to the inlet pipe 24 (e.g., soldering) and an outlet 32 which is connected to the outlet pipe 26 in an identical manner. The valve housing 28 also includes a fitting receiving formation 34 with an opening 36 formed therein which extends along an axis A generally transverse to an axis B which extends between the inlet 30 and the outlet 32. The valve housing 28 is provided with a valve seat 38 formed in a wall 40 that extends between the inlet 30 and the outlet 32. The valve seat 38 has an opening 42 formed therein which allows fluid to pass from the inlet 30 to the outlet 32.

As shown in FIGS. 3 and 5, the valve 22 further includes a plunger valve member assembly, generally indicated at 44, which includes a brass fitting 46 having threads for threadably engaging the female threads of the fitting receiving formation 34. The brass fitting 46 of the assembly houses a valve stem 48 which is axially movable in an up-and-down direction along axis A. At the lower end of the valve stem 48 is a valve member 50 fabricated from any suitable elastomeric material for sealingly engaging the valve seat 38 of the valve housing 28. The valve member 50 is circular in plan view and shaped for fully and sealingly engaging the valve seat for blocking the opening 42 formed in wall 40. The valve stem 48 can be moved axially along axis A for moving the valve member 50 between a closed position in which the valve member 50 sealingly engages the valve seat 38 for blocking the flow of fluid from the inlet 30 to the outlet 32 (see FIG. 6) and an open position in which the valve member 50 is spaced from the valve seat 38 (see FIG. 5) for allowing fluid to pass from the inlet 30 to the outlet 32. The valve stem 48 is biased to its open position by a spring 52 which is illustrated in broken lines. Spring 52 is disposed between the bottom of brass fitting 46 and an annular flange 49 on valve stem 48. Spring 52 has a length which allows it to be tensionally fit between brass fitting 46 and annular flange 49, to bias the valve stem 48 in its open position. When the valve stem 48 is driven downward, as will be described below, spring 52 is compressed between brass fitting 46 and annular flange 49.

Referring now to FIGS. 4 and 5, the valve actuating device 20 comprises a generally box-shaped housing, generally indicated at 54. The housing 54 includes a fitting or collar 56 having internal threads which, when securing the valve actuating device 20 to the valve 22, threadably engage the outer threads of the fitting receiving formation 34 of the valve 22. When assembled, the device 20 and valve 22 assume the configuration illustrated in FIGS. 1 and 2.

A motor, generally designated 58, is mounted on an interior wall 60 of the housing 54. The motor 58 is provided for reciprocally moving a T-shaped rack, generally indicated at 62, which engages the valve stem 48 of the valve 22 for moving the valve member 50 between its opened and closed positions. More particularly, the motor 58 is a 2-watt bidirectional direct current (D.C.) motor having a shaft 64 which extends through an opening (not designated) formed in the interior wall 60. At the outer end of the shaft 64 of the motor 58 is a pinion gear 66 which is adapted to engage the teeth 84 of rack 62 for moving the rack 62 along axis A. Motor 58 includes a timing and control circuit (not shown) for controlling the amount of time that power is applied to the motor in order to open and close the valve. Preferably, when closing the valve, the timing circuit provides power to the motor 58 for approximately twelve seconds in order to drive pinion gear 66 in the clockwise direction to fully close the valve 22. When opening the valve, the timing circuit provides power to the motor 58 for approximately ten seconds in order to drive pinion gear 66 in the counterclockwise direction to fully open the valve 22. The torque produced by motor 58 when closing the valve 22 is sufficient to overcome the upward force caused by spring 52, as well as the pump head pressure caused by fluid flowing across valve member 38. The timing circuit is programmed to power the motor 58 so as to alternate between driving the pinion gear 66 in the clockwise direction, thus allowing the valve to open, and the counterclockwise direction, thus causing the rack 62 to drive the valve stem 48 downward to close the valve 22.

Alternatively, the timing circuit may be programmed to power the motor for less than the above-indicated times in order to partially close the valve 22. This allows the valve to operate as a modulating valve to regulate the flow of fluid from inlet 30 to outlet 32.

Mounted onto the back wall 60 of housing 54 are an upper bearing surface 200 which holds the upper portion of elongate section 72 in position against a bearing surface 202 as rack 162 moves upward and downward, and a lower roller bushing 204 which holds the lower portion of elongate section 72 in position to ensure that teeth 84 remain in engagement with pinion gear 66. Bushing 204 may be formed of rubber around a metal core, or any other material which is commonly used in the manufacture of bushings of this type. Bearing surfaces 200 and 202 are mounted to back wall 60 and may be formed of metal, plastic or any commonly used low-friction, long wearing material. Stops 206 and 208 are mounted to back wall 60 on either side of the upper portion of elongate section 72 in order to limit the travel of rack 62 by providing a contact for cross section 76 at the lower end of travel of the rack 62. An upper stop 210 is mounted to the top surface 161 of housing 154 to provide a contact for cross section 76 at the upper end of travel of the rack 62. Upper stop 210 is preferably formed from a brass or steel shim, however, a spring or other cushioning material may also be used to form the upper stop 210.

Figure 6:
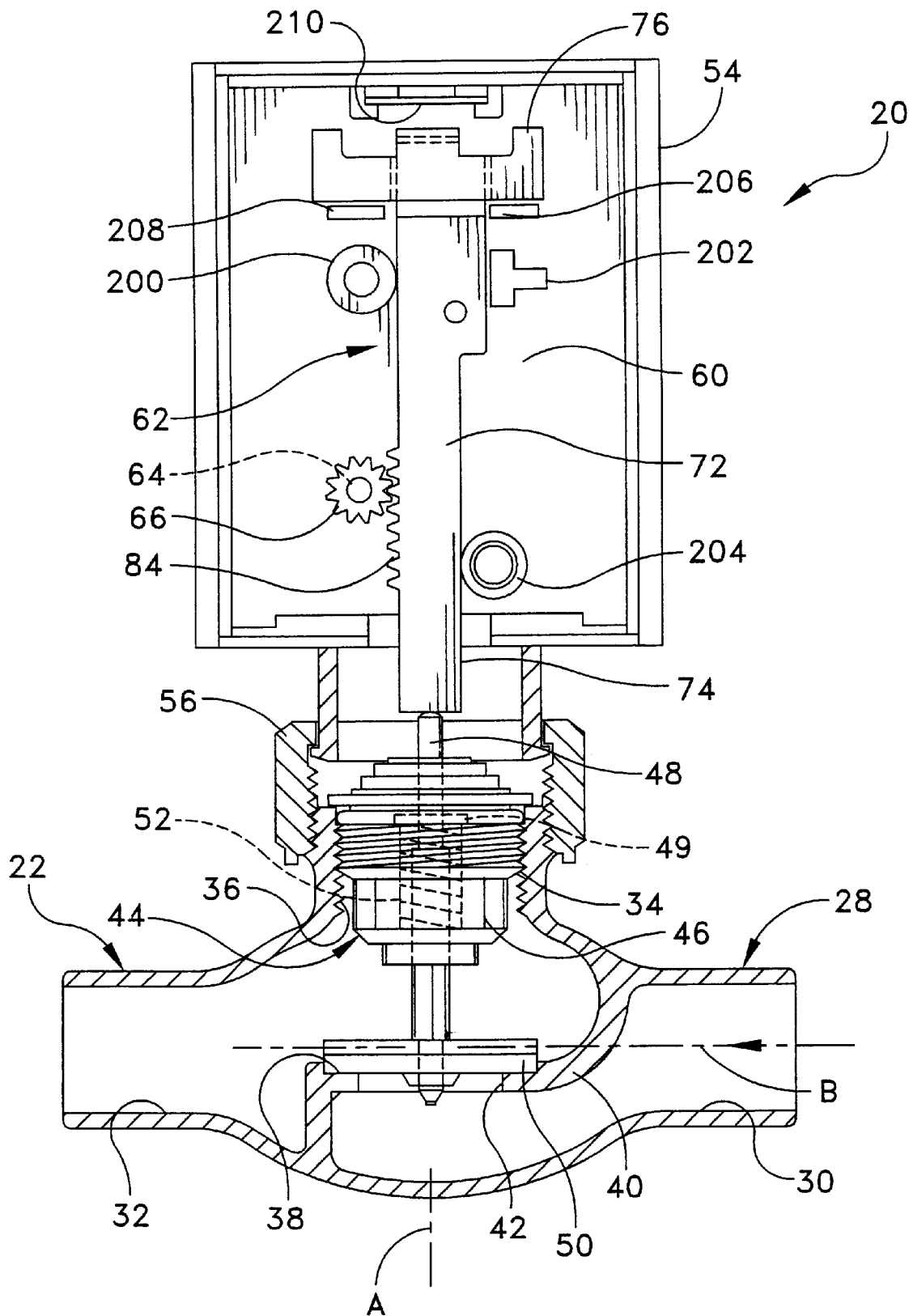

Turning now to FIGS. 5 and 6, the operation of the valve actuating device 20 will be described. FIG. 5 shows the valve actuating device in a first position in which the rack 62 is in contact with upper stop 210 and valve 22 is open, due to the upward biasing force of spring 52. When the valve 22 is to be closed, the timing and control circuit sends power of the correct polarity to motor 58, which turns pinion gear 66 in the clockwise direction. The teeth of the pinion gear 66 engage the teeth 84 of rack 62, and the rack is driven downwardly, causing end portion 74 of elongate section 72 to push valve stem 48 downward, thus closing the valve 22, as shown in FIG. 6. As discussed above, the motor is energized for approximately twelve seconds during this closing operation. Once the valve is fully closed, power to the motor is stopped and the internal friction of the motor allows pinion gear 66 to hold rack 62 in the downward position, thus maintaining valve 22 in the closed position.

In order to open the valve 22, the timing circuit sends power of the opposite polarity to motor 58, which turns pinion gear 66 in the counterclockwise direction. The teeth of the pinion gear 66 engage the teeth 84 of rack 62, and the rack is driven upwardly, causing end portion 74 of elongate section 72 to release valve stem 48, thus allowing the spring 52 to push valve 22 open, as shown in FIG. 5. As discussed above, the motor is energized for approximately ten seconds during this opening operation. Once the valve is fully opened, power to the motor is stopped.

Thus, the present invention provides a valve actuating device which, by utilizing a bidirectional D.C. motor, reduces the amount of power required to maintain the valve 22 in the closed position. This reduces the stress on the motor 58, thus extending the operational life of the motor 58. Furthermore, the motor allows the valve to be held partially open in order to regulate the flow of fluid through the valve.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A valve actuating device for opening and closing a valve, the valve having a valve housing, a valve member sealingly engageable with a valve seat formed in the valve housing and a valve stem attached to the valve member for moving the valve member from an open position to a closed position, said valve member being biased to the open position, the valve actuating device comprising:

a housing which is constructed and arranged to be attachable to the valve housing of the valve;

a bidirectional motor mounted on said housing;

a pinion gear which is coupled to said motor by a shaft, said pinion gear being drivable by said motor via said shaft; and a rack including a body having an end portion which is engageable with the valve stem of the valve and a side portion having a number of teeth thereon for meshing with teeth of said pinion gear, said rack being moveable, by said motor driving said pinion gear, between a first position in which the valve is in its open position and a second position in which the end portion of the rack engages the valve stem for maintaining the valve stem in its closed position.

2. The valve actuating device of claim 1, wherein said bidirectional motor includes circuitry for controlling power supplied to the motor for a first amount of time in which the rack is moved from said first position to said second position, and for controlling power supplied to the motor for a second amount of time in which the rack is moved from said second position to said first position.

3. The valve actuating device of claim 2, wherein said bidirectional motor is a direct current motor.

4. The valve actuating device of claim 3, further comprising alignment devices mounted to said housing, said alignment devices positioning and maintaining said rack in place within said housing.

5. The valve actuating device of claim 3, wherein said circuitry for controlling power supplied to the motor supplies power to said motor for a third amount of time, said third amount of time being less than said first and second amounts of time, in which the rack is moved to a third position between said first position and said second position, to maintain said valve in a position between the open position and the closed position for modulating a flow of fluid through the valve.

* * * * *